United States Patent
Briley et al.

(10) Patent No.: US 8,517,333 B2
(45) Date of Patent: Aug. 27, 2013

(54) FLUID ACTUATED VALVE WITH HALL POSITION SENSOR

(75) Inventors: Ara Briley, Chandler, AZ (US); Craig Kolb, Apache Junction, AZ (US); Ed Kesner, Mesa, AZ (US); Joel LaBenz, Chandler, AZ (US); David Pantier, Gilbert, AZ (US); Dave Tornquist, Chandler, AZ (US); Maureen Sugai, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 183 days.

(21) Appl. No.: 12/874,975

(22) Filed: Sep. 2, 2010

(65) Prior Publication Data

US 2012/0056115 A1    Mar. 8, 2012

(51) Int. Cl.
*F16K 31/12* (2006.01)
(52) U.S. Cl.
USPC .............. 251/58; 251/279; 251/305; 137/554
(58) Field of Classification Search
USPC ........................................... 137/554; 251/58
See application file for complete search history.

(56) References Cited

U.S. PATENT DOCUMENTS

| | | | |
|---|---|---|---|
| 4,392,375 A * | 7/1983 | Eguchi et al. ................. | 137/554 |
| 4,398,704 A | 8/1983 | Buchanan, Jr. et al. | |
| 4,793,241 A * | 12/1988 | Mano et al. ..................... | 92/5 R |
| 4,971,288 A * | 11/1990 | Tanner et al. ................... | 251/57 |
| 5,439,275 A | 8/1995 | Padula et al. | |
| 5,568,760 A | 10/1996 | Volzer | |
| 6,152,172 A | 11/2000 | Christianson et al. | |
| 6,633,157 B1 | 10/2003 | Yamaki et al. | |
| 7,036,791 B2 * | 5/2006 | Wiese ..................... | 251/129.04 |
| 7,044,444 B2 | 5/2006 | Haubold et al. | |
| 7,423,421 B2 | 9/2008 | Reichert et al. | |
| 2003/0173533 A1 * | 9/2003 | Baumann ........................ | 251/58 |
| 2007/0290677 A1 | 12/2007 | Christianson et al. | |
| 2008/0092960 A1 | 4/2008 | Manecke et al. | |
| 2009/0008583 A1 | 1/2009 | Grethel | |
| 2009/0322315 A1 | 12/2009 | Dengler | |

* cited by examiner

*Primary Examiner* — John K Fristoe, Jr.
*Assistant Examiner* — Angelisa Hicks
(74) *Attorney, Agent, or Firm* — Ingrassia Fisher & Lorenz, P.C.

(57) ABSTRACT

A valve actuator includes an actuator housing, a piston, a linkage assembly, a magnet, and a Hall sensor. The actuator housing is adapted to receive pressurized fluid. The piston is movably mounted within actuator housing, and is configured to translate in a first direction and a second direction. The linkage assembly is rotationally coupled to the piston and is adapted to couple to a valve element. The linkage assembly is configured to rotate the valve element in a first rotational direction and a second rotational direction in response to piston movement in the first direction and the second direction, respectively. The magnet is mounted on the piston and is movable therewith, and the Hall sensor is mounted on the actuator housing and is responsive to movement of the magnet to supply a position signal.

8 Claims, 5 Drawing Sheets

FLUID ACTUATED VALVE WITH HALL POSITION SENSOR

TECHNICAL FIELD

The present invention generally relates to fluid-actuated valves, and more particularly relates to a fluid-actuated valve that uses a Hall-effect sensor to detect valve position.

BACKGROUND

Valves are used in myriad systems and environments, and may be operated in numerous and varied ways. Some valves are manually operated, others are operated via electrical, hydraulic, pneumatic, or various other types of actuators. In one particular implementation, a valve is operated via a pneumatic actuator that is configured to open the valve upon receipt of pressurized air, and close the valve when the pressurized air is no longer supplied.

It is additionally desirable that valves, such as the one described above, include some means of sensing valve position. Presently, position sensing devices that are used to sense the position of fluid-actuated valves are relatively expensive, exhibit relatively low reliability, and for mechanical-type devices are limited to the number of cycles they can endure in a useful life. Moreover, adding a position sensing device to a valve often requires increased weight and space.

Accordingly, it is desirable to provide a position sensing device for a fluid-actuated valve that is relatively inexpensive, exhibits relatively high reliability, is non-mechanical, and/or is does not increase (or significantly increase) weight and space when added to a valve. The present invention addresses at least these needs.

BRIEF SUMMARY

In one embodiment, a valve actuator includes an actuator housing, a piston, a linkage assembly, a magnet, and a Hall sensor. The actuator housing has an actuator housing inner surface and an actuator housing outer surface. The actuator housing inner surface defines an actuator housing inner volume that is adapted to receive pressurized fluid. The piston is movably mounted within the actuator housing inner volume, and is configured to translate in a first direction and a second direction. The linkage assembly is rotationally coupled to the piston and is adapted to couple to a valve element. The linkage assembly is configured to rotate the valve element in a first rotational direction and a second rotational direction in response to piston movement in the first direction and the second direction, respectively. The magnet is mounted on the piston and is movable therewith. The Hall sensor is mounted on the actuator housing outer surface and is responsive to movement of the magnet to supply a position signal.

In another embodiment, a valve assembly includes a flow body, a valve element, and a valve actuator. The flow body has a flow passage extending therethrough, and the valve element is disposed within the flow passage and is rotatable between a closed position and an open position. The valve actuator is coupled to the flow body and includes an actuator housing, a piston, a linkage assembly, a magnet, and a Hall sensor. The actuator housing is coupled to the flow body and has an actuator housing inner surface and an actuator housing outer surface. The actuator housing inner surface defines an actuator housing inner volume that is adapted to receive pressurized fluid. The piston is movably mounted within the actuator housing inner volume, and is configured to translate in a first direction and a second direction. The linkage assembly is coupled to the valve element and is rotationally coupled to the piston. The linkage assembly is configured to rotate the valve element between the closed and the open position in response to piston movement in the first direction and the second direction, respectively. The magnet is mounted on the piston and is movable therewith, and the Hall sensor is mounted on the actuator housing outer surface and is responsive to movement of the magnet to supply a position signal.

In yet another embodiment, a valve actuator includes an actuator housing, a piston, a linkage assembly, a magnet, a sensor housing, and a Hall sensor. The actuator housing has an actuator housing inner surface and an actuator housing outer surface. The actuator housing inner surface defines an actuator housing inner volume that is adapted to receive pressurized fluid. The piston is movably mounted within the actuator housing inner volume and is configured to translate in a first direction and a second direction. The piston includes a piston outer surface and a piston inner surface. The piston outer surface has a magnet recess formed thereon, and the piston inner surface defines a piston inner volume. The linkage assembly is disposed within the piston inner volume and is rotationally coupled to the piston. The linkage assembly is adapted to couple to a valve element and is configured to rotate the valve element in a first rotational direction and a second rotational direction in response to piston movement in the first direction and the second direction, respectively. The magnet is disposed within the piston recess and is movable with the piston. The sensor housing is adjustably mounted on the actuator housing outer surface. The Hall sensor is disposed within the sensor housing and is responsive to movement of the magnet to supply a position signal.

Furthermore, other desirable features and characteristics of the actuator and valve assembly will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "fluid" encompasses both liquid and gaseous fluids. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
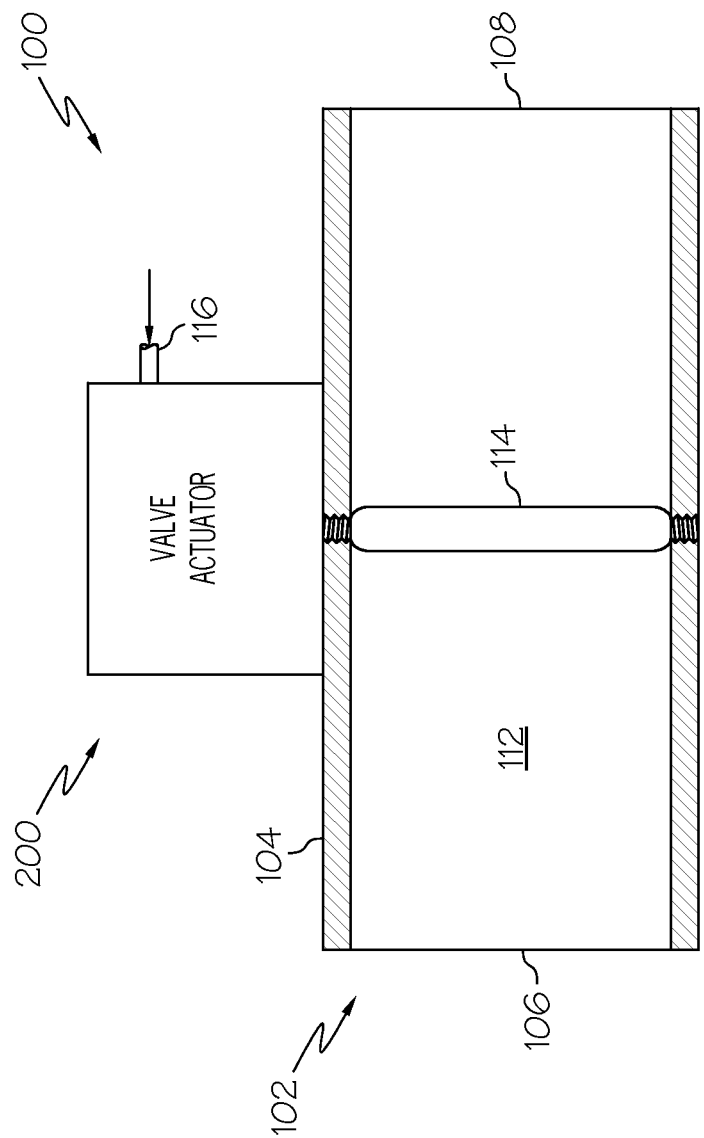
FIG. 1 depicts a simplified schematic representation of an embodiment of an exemplary fluid-actuated valve assembly.

Referring first to FIG. 1, a simplified schematic representation of an exemplary fluid-actuated valve assembly 100 is depicted, and includes a valve 102 and a valve actuator 200. The valve 102 includes a flow body 104 that has an inlet port 106, an outlet port 108, and a flow passage 112 that extends through the flow body 104 between the inlet and outlet ports 106, 108. The flow body 104 may be constructed of any one of numerous suitable materials and, while it preferably has a circular cross section, the flow passage 112 may have any one of numerous suitable cross sectional shapes.

A valve element 114 is disposed within the flow passage 112, and is rotationally mounted on the flow body 104. The valve element 114 is rotatable between a closed position and one or more open positions. In the closed position, which is the position depicted in FIG. 1, fluid flow through the flow passage 112 is blocked, whereas in an open position, fluid flow may flow through the flow passage. The valve element 114 may be variously configured to implement its functionality. For example, it may be configured as a butterfly plate, a globe valve element, or a gate valve element, just to name a few. No matter its specific configuration, the valve element 114 is rotated between the closed and open positions via the valve actuator 200.

The valve actuator 200 is coupled to the flow body 104 and is also coupled to the valve element 114. The valve actuator 200 includes a fluid inlet 116 that is adapted to selectively receive pressurized fluid from a non-illustrated pressurized fluid source. The valve actuator 200 is configured, upon receipt of the pressurized fluid, to supply a drive torque to the valve element 114 that causes the valve element 114 to rotate. In the depicted embodiment, the valve actuator 200 is configured to rotate the valve element 114 to the open position upon receipt of the pressurized fluid, and to rotate the valve element 114 to the closed position when the pressurized fluid is no longer being supplied thereto. It will be appreciated, however, that this is merely exemplary of one particular configuration, and that the valve actuator 200 could be variously configured to position the valve element 114.

Figure 2:
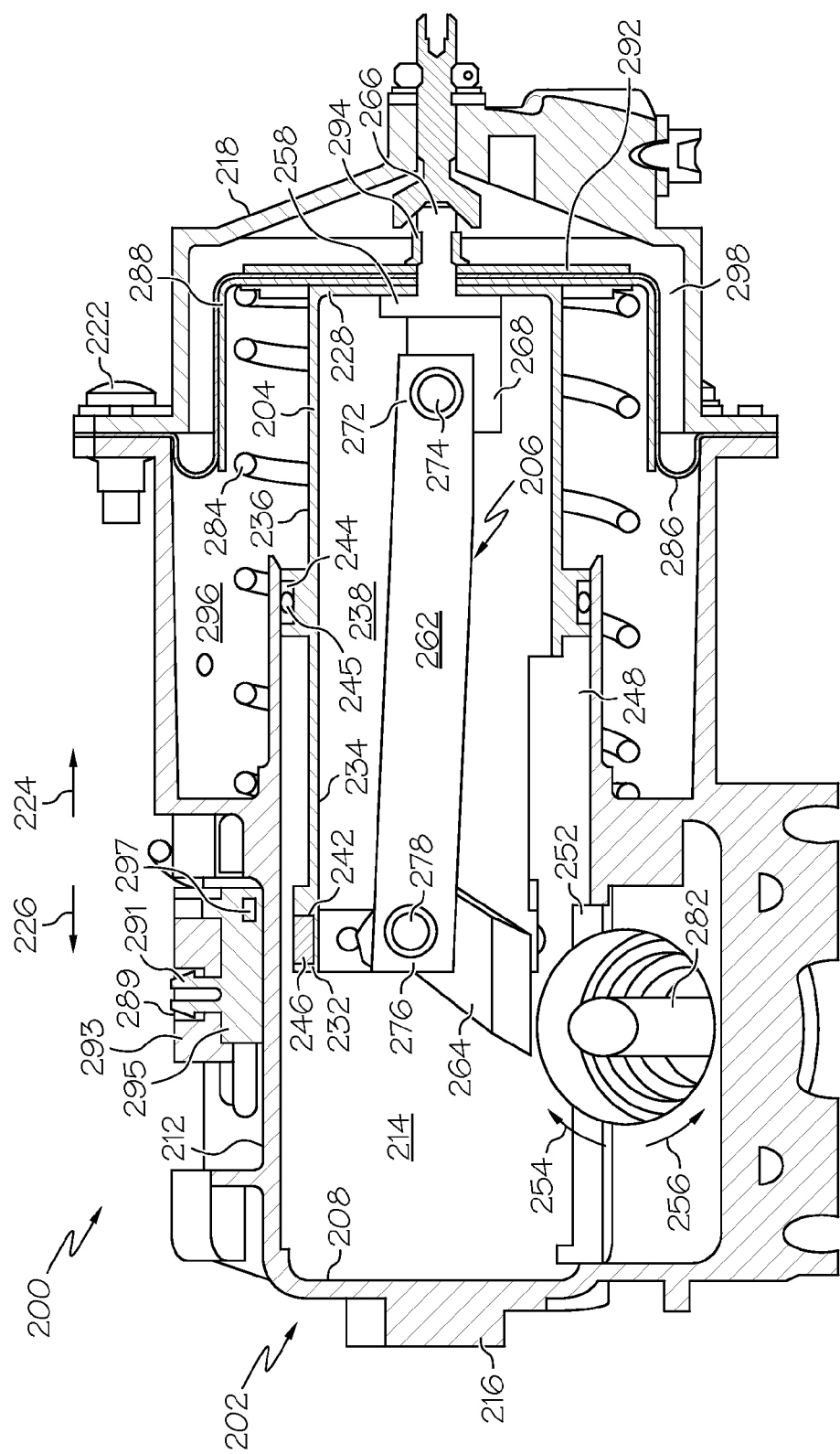
FIG. 2 depicts a cross section view of an of a particular physical implementation of an actuator assembly that may be used to implement the valve assembly of FIG. 1.

Turning now to FIG. 2, a cross section view of a particular physical implementation of the valve actuator 200, according to a preferred embodiment, is depicted and includes an actuator housing 202, a piston 204, and a linkage assembly 206. The actuator housing has an inner surface 208 and an outer surface 212. The actuator housing inner surface 208 defines an inner volume 214 that receives the pressurized fluid from the non-illustrated pressurized fluid source. The actuator housing 202 may be variously configured, but in the depicted embodiment it includes an upper housing section 216 and a lower housing section 218 that coupled together via suitable fastener hardware 222.

The piston 204 is movably mounted within the actuator housing inner volume 214 and is configured to translate in a first direction 224 and a second direction 226. The piston 204 includes a first end 228, a second end 232, an inner surface 234, and an outer surface 236. The piston inner surface 234 defines an inner volume 238, and the piston outer surface 236 has a magnet recess 242 and a piston seal groove 244 formed thereon. A magnet 246 is inserted within the magnet recess 242, which is disposed adjacent the second end 232 of the piston 204. The magnet 246 may be held within the magnet recess 242 via epoxy or via a friction fit. A seal 245 is disposed within the piston seal groove 244 and engages a portion of the actuator housing inner surface 208. More specifically, it is seen that a portion of the actuator housing inner surface 208 defines a piston bore 248. The piston 204 is disposed partially within the piston bore 248, and the seal 245 engages the inside wall of the piston bore 248. As FIG. 2 also depicts, the piston bore 248 also defines a linkage assembly opening 252, through which the linkage assembly 206 extends.

The linkage assembly 206 is rotationally coupled to the piston 204 and to the valve element 114 (not depicted in FIG. 2). The linkage assembly 206 is configured to rotate the valve element 114 in a first rotational direction 254 and a second rotational direction 256 in response to piston movement in the first direction 224 and the second direction 226, respectively, and thereby move the valve element 114 to the closed position and an open position, respectively. Although the linkage assembly 206 may be variously configured to implement this functionality, in the depicted embodiment it includes a first link mount 258, a link arm 262, a valve interface arm 264, and a second link mount 302 (see FIG. 3). The first link mount 258 includes a fastener portion 266 that extends through the piston first end 238 and couples the link mount 258 to the piston 204, and a flange portion 268 that extends from the fastener portion 266 into the piston inner volume 234.

The link arm 262 is rotationally coupled at a first end 272 to the flange portion 268, via suitable hardware 274 and, at a second end 276, is coupled to the valve interface arm 264, and is rotationally coupled to one end of the second link mount 302 also via suitable hardware 278. The valve interface arm 264 extends through the linkage assembly opening 252 and is coupled to the valve element 114. More specifically, the valve interface arm 264 is coupled to a shaft 282 that extends into the flow body 104, and is coupled to the valve element 114. The second link mount 302 is rotationally mounted, via its second end, to the actuator housing 202 via suitable hardware 304.

The depicted valve actuator additionally includes a spring 284 and a diaphragm 286. The spring 284 is disposed within the actuator housing inner volume 214 and engages the actuator housing inner surface 208 and the piston 204, and supplies a bias force to the piston 204 that biases it in the first direction 224. More specifically, at least in the depicted embodiment, the spring 284 surrounds the piston bore 248 and a portion of the piston 204, and engages the actuator housing inner surface 208 and the inner surface of a diaphragm guide 288 that is coupled to the piston first end 232.

The diaphragm 286 is disposed within, and is coupled to, the actuator housing inner volume 214, and is also coupled to the piston 204. The diaphragm 286 has an outer peripheral portion that is disposed between the upper housing section 216 and the lower housing section 218, and is held against the outer surface of the diaphragm guide 288 via a plate 292, the link mount fastener portion 266, and a fastener 294 that is threaded onto the fastener portion 266 of the link mount 258. The diaphragm 286 thus divides the actuator housing inner volume 214 into a first volume 296 and a second volume 298. The piston 204, the linkage assembly 206, and the spring 284 are all disposed within the first volume 296, and the second volume 298 is coupled to receive the pressurized fluid.

With the above-described configuration, it may be understood that the valve actuator 200 biases the valve element 114 to the closed position. When pressurized fluid of sufficient pressure is supplied to the second volume 298, the pressure acting on the diaphragm 286 will supply a force to the piston 204 that overcomes the bias force supplied by the spring 284. As a result, the piston 204, and concomitantly the link arm 262, will translate in the second direction 226. As the piston 204 and link arm 262 translate, the valve interface arm 264 rotates, and supplies a torque to the valve element 114 to thereby rotate it to an open position. When pressurized fluid is no longer supplied to the second volume 298, the spring 284 biases the piston 204 to move in the first direction 224, and cause the valve element 114 to move back to the closed position.

The position of the valve element 114, as being in either the closed position or an open position, is detected via a Hall sensor 297. The Hall sensor 297 is mounted on the actuator housing outer surface 212. As is generally known, a Hall sensor is responsive to a magnetic field to generate an electric signal. In the depicted embodiment, the magnetic field to which the Hall sensor 297 is responsive is supplied from the magnet 246 that is disposed within the magnet recess 242 on the piston outer surface 236. It may thus be appreciated that the Hall sensor 297 is responsive to movement of the magnet 246 to supply a position signal.

Figure 3:
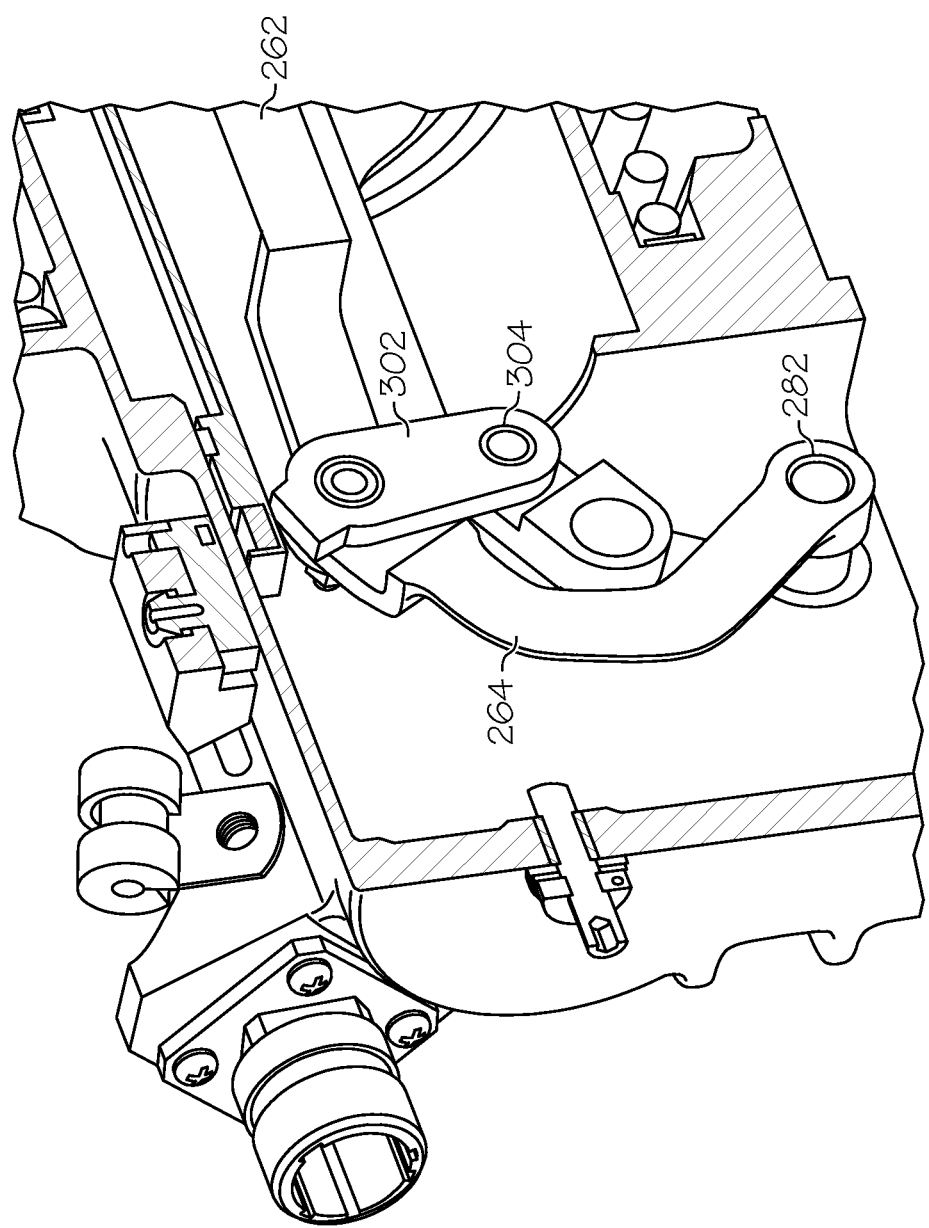
FIGS. 3 and 4 depict close-up cross section and outside views of a portion of the actuator assembly depicted in FIG. 2.
Figure 4:
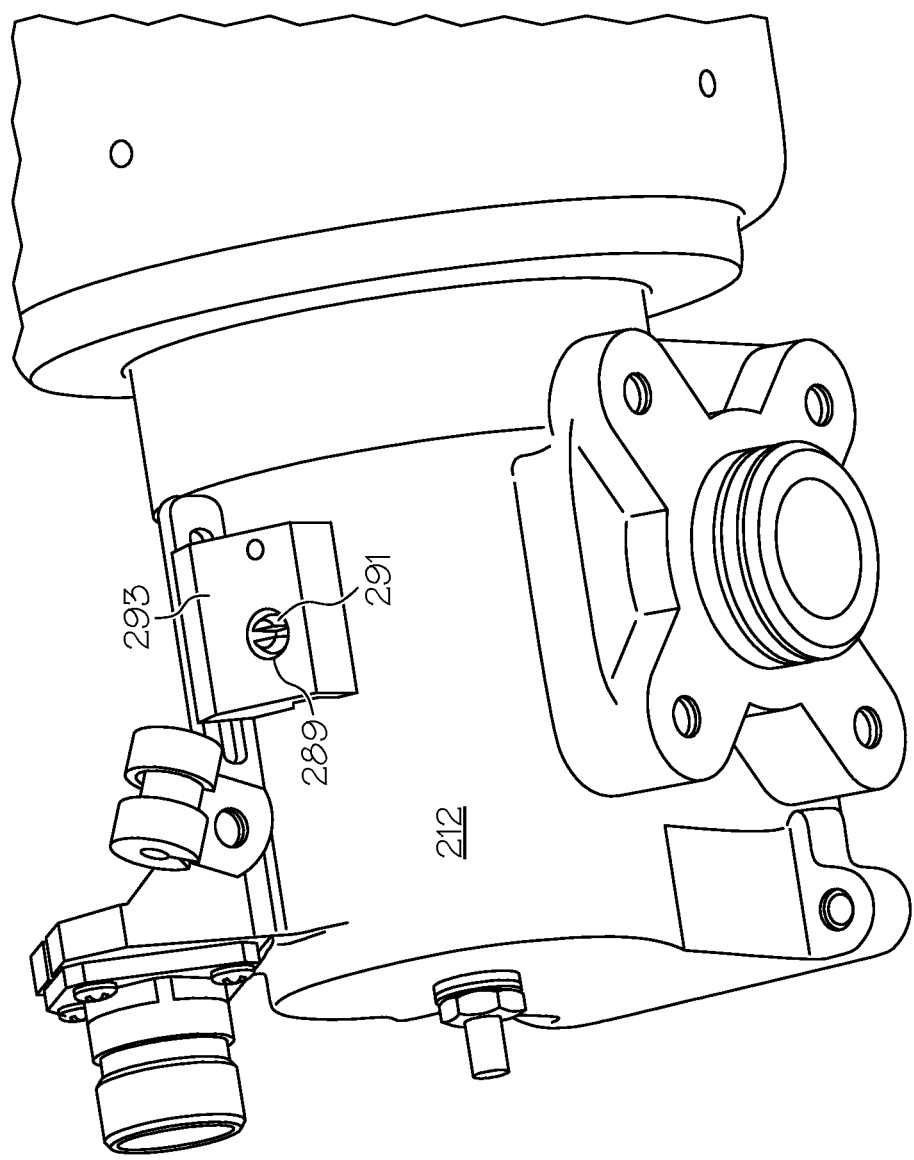

In the depicted embodiment, and with reference to FIGS. 2-4, it may be seen that the Hall sensor 297 is disposed within a non-metallic sensor case 295, such as a plastic sensor case. The sensor case 295 is in turn mounted within a sensor housing 293, which is preferably formed of a metallic material, such as aluminum. Though the manner in which the sensor case 295 is mounted in the sensor housing 293 may vary, in the depicted embodiment it includes a barbed protrusion 291 that is snapped into a suitably sized opening 289 in the sensor housing 293.

Figure 5:
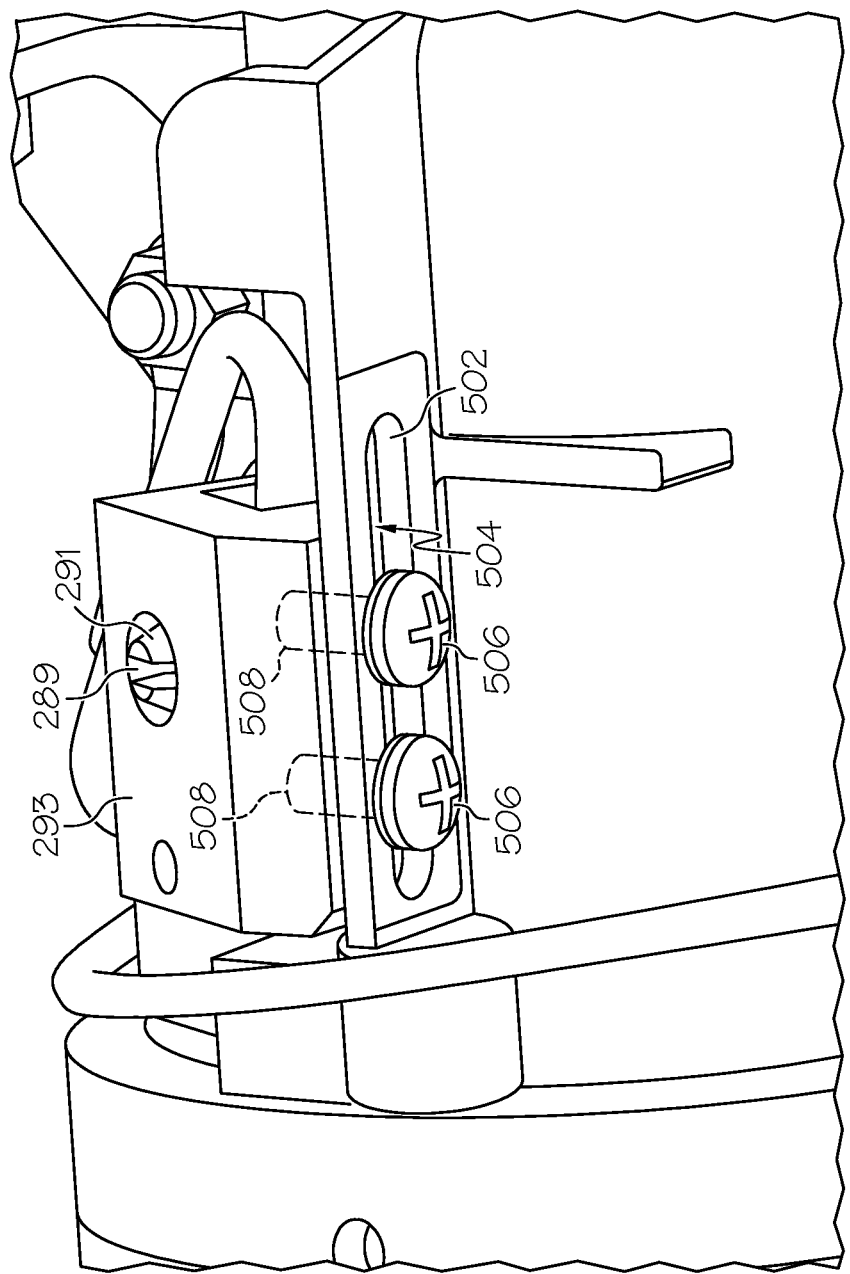
FIG. 5 depicts a close-up section of an outside portion of the actuator assembly depicted in FIG. 2, showing a sensor mounting feature in more detail.

The sensor housing 293 is adjustably mounted on the actuator housing outer surface 212. More specifically, as FIG. 5 depicts most clearly, a mount flange 502 is preferably formed on the actuator housing outer surface 212. The mount flange 502 includes a slot 504 through which a plurality of fasteners 506 extend. The fasteners 506, which are implemented using suitably sized screws in the depicted embodiment, are each threaded into a fastener opening 508 (shown in phantom in FIG. 5) in the sensor housing 293. This adjustability feature provides for relatively quick and easy calibration of the Hall sensor 297 following initial installation, maintenance, or replacement of either the Hall sensor 297, the magnet 246, or both.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A valve actuator, comprising:
   an actuator housing having an actuator housing inner surface and an actuator housing outer surface, the actuator housing inner surface defining an actuator housing inner volume that is adapted to receive pressurized fluid;
   a piston movably mounted within the actuator housing inner volume, the piston comprising a piston outer surface and a piston inner surface, the piston outer surface having a magnet recess formed thereon, the piston inner surface defining a piston inner volume, the piston configured to translate in a first direction and a second direction;
   a linkage assembly disposed within the piston inner volume, the linkage assembly rotationally coupled to the piston and adapted to couple to a valve element, the linkage assembly configured to rotate the valve element in a first rotational direction and a second rotational direction in response to piston movement in the first direction and the second direction, respectively;
   a magnet disposed within the magnet recess and movable with the piston;
   a mount flange formed on the actuator housing outer surface, the mount flange having a slot formed therein;
   a metallic sensor housing adjustably mounted on the actuator housing outer surface and having a case opening and a plurality of fastener openings formed therein;
   a plurality of fasteners extending through the mount flange and disposed, one each in a single one of the fastener openings;
   a non-metallic sensor case disposed within the metallic sensor housing, the non-metallic sensor case including a barbed protrusion that is snapped into the case opening in the metallic sensor housing; and
   a Hall sensor disposed within the non-metallic sensor case and responsive to movement of the magnet to supply a position signal.

2. The actuator of claim 1, further comprising;
   a spring disposed within the actuator housing inner volume and engaging the actuator housing inner surface and the piston, the spring supply a bias force to the piston that biases the piston toward the first direction.

3. The actuator of claim 2, further comprising:
   a diaphragm coupled to the actuator housing and to the piston, the diaphragm dividing the actuator housing inner volume into a first volume and a second volume,
   wherein the piston, the linkage assembly, and the spring are all disposed within the first volume, and the second volume receives the pressurized fluid.

4. The actuator of claim 3, wherein:
   the actuator housing comprises an upper housing section and a lower housing section, the upper housing section and lower housing section coupled together; and
   the diaphragm has an outer peripheral portion disposed between the upper housing section and the lower housing section.

5. A valve assembly, comprising:
   a flow body having a flow passage extending therethrough;
   a valve element disposed within the flow passage and rotatable between closed position and an open position; and
   a valve actuator coupled to the flow body, the valve actuator comprising:
   an actuator housing coupled to the flow body and having an actuator housing inner surface and an actuator housing outer surface, the actuator housing inner surface defining an actuator housing inner volume that is adapted to receive pressurized fluid;
   a piston movably mounted within the actuator housing inner volume, the piston comprising a piston outer surface and a piston inner surface, the piston outer surface having a magnet recess formed thereon, the piston inner surface defining a piston inner volume, the piston configured to translate in a first direction and a second direction;
   a linkage assembly disposed within the piston inner volume, the linkage assembly coupled to the valve element and rotationally coupled to the piston, the linkage assembly configured to rotate the valve element between the closed and the open position in response to piston movement in the first direction and the second direction, respectively;

a magnet disposed within the magnet recess and movable with the piston;

a mount flange formed on the actuator housing outer surface, the mount flange having a slot formed therein;

a metallic sensor housing adjustably mounted on the actuator housing outer surface and having a case opening and a plurality of fastener openings formed therein;

a plurality of fasteners extending through the mount flange and disposed, one each in a single one of the fastener openings;

a non-metallic sensor case disposed within the metallic sensor housing, the non-metallic sensor case including a barbed protrusion that is snapped into the case opening in the metallic sensor housing; and a Hall sensor disposed within the non-metallic sensor case and responsive to movement of the magnet to supply a position signal.

6. The valve assembly of claim 5, further comprising;

a spring disposed within the actuator housing inner volume and engaging the actuator housing inner surface and the piston, the spring supply a bias force to the piston that biases the piston toward the first direction.

7. The valve assembly of claim 6, further comprising:

a diaphragm coupled to the actuator housing and to the piston, the diaphragm dividing the actuator housing inner volume into a first volume and a second volume, wherein the piston, the linkage assembly, and the spring are all disposed within the first volume, and the second volume receives the pressurized fluid.

8. The valve assembly of claim 6, wherein:

the actuator housing comprises an upper housing section and a lower housing section, the upper housing section and lower housing section coupled together; and the diaphragm has an outer peripheral portion disposed between the upper housing section and the lower housing section.

* * * * *